Dec. 24, 1940. G. N. BRUNKER 2,225,819
WEATHER STRIP
Filed June 20, 1938
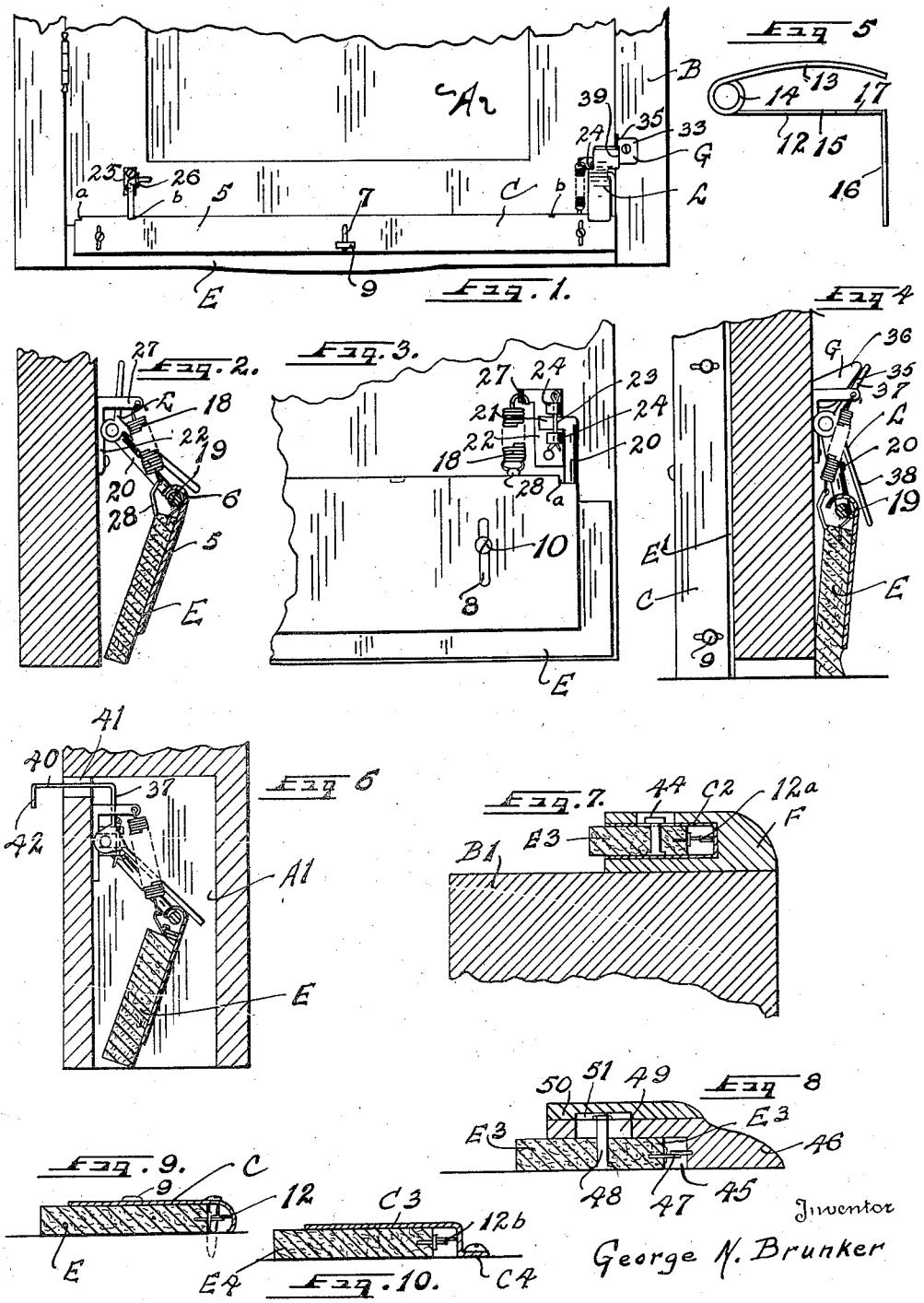
Inventor
George N. Brunker
By R. M. Thomas
Attorney Patented Dec. 24, 1940

2,225,819

UNITED STATES PATENT OFFICE 2,225,819

WEATHER STRIP

George N. Brunker, Salt Lake City, Utah

Application June 20, 1938, Serial No. 214,633

1 Claim. (Cl. 20—68)

My invention relates to weather strips and has for its object to provide a new and efficient closure weather strip for sealing under or along the bottom of a closure.

A further object is to provide a door strip which will raise instantly when the door is opened and which will raise a distance greater than the space between the door and the door sill or flooring under the door.

A still further object is to provide a door strip which will be economical to manufacture, easy to install, and adjustable as to height so that one strip may be made to fit any distance between the door and floor.

A still further object is to provide a self actuated door strip which will be raised when the door is opened and which will be lowered into the closed position when the door is closed, but which strip will raise as soon as the door has been moved a very small fraction of the opening distance and which will be lowered to the floor quickly as soon as the door reaches a predetermined small distance from the closed position, the same bracket being used to release the raising of the strip and to lower it to the closed position.

A still further object is to provide a simple, efficient door strip, light in weight, carrying a strip of adjustably mounted felt or rubber, or other suitable material for sealing the air space under the door, and which sealing material will be mounted with spring pressure between the holding strip and the sealing material, to adjust the material to any unevenness of the floor under the door or to take up wear on the door sill and still keep the air from passing under the door.

A still further object is to provide a removable weather strip which may be taken from the door during the summer if desired, and replaced again in the fall but which weather strip when used in territories which are bothered by insects or dust may be used throughout the entire year to perfectly seal the ends of the door against intrusion by such insects or dust.

A still further object is to provide a weather strip which may be used for the bottom of the door or which may be made in its identical form removing the lifting and supporting features and used around the entire perimeter of the door other than the bottom, to completely seal the door without effecting the opening or closing of the door or changing the strip itself.

A still further object connected with my invention is the forming of the strip so that the strip may be used on either right or left hand opening doors without change to any part of the device.

A still further object is to provide a door strip which may be inserted and carried within a longitudinal recess within the bottom of the door.

This application is a continuation in part of my two former patent applications filed in the United States Patent Office, for Weather strips for closures, on Dec. 23, 1936, Ser. No. 117,271, issued as Patent No. 2,126,726, and Aug. 18, 1937, Serial No. 158,837, issued as Patent No. 2,126,727, showing my weather strip with improved method of applying it to the door, and using a portion thereof for completely sealing around the perimeter of the door.

In the drawing,

Figure 1 is a view of a door equipped with my strip shown closed and sealed with the bottom of the strip shown closing a worn area on the door sill.

Figure 2 is a sectional view of the door showing the strip raised from the floor with the door open.

Figure 3 is a face view of one edge of the door showing an end of the strip and its support brackets showing the closing lever removed.

Figure 4 is a sectional view of the door and frame with the door closed and the strip engaging the sill.

Figure 5 is a view of one of the tension springs used to hold the strip in spring tension relation to the floor sill or frame when the door is closed.

Figure 6 is a sectional view of a door showing the strip inserted in a longitudinal recess within the door.

Figure 7 is a sectional view of the weather strip feature of the device shown inserted in a door stop.

Figure 8 is a modified view showing the door stop made in two sections to cover the door stop weather stripping.

Figure 9 is a sectional view of the attachment plate and weather strip which may be used in either the door strip across the bottom or may be used around the sides of the door as strip.

Figure 10 is a view of the strip as shown used with a right angled attachment plate carrying a securing flange along one edge thereof.

In the drawing the door is shown as A, the door frame as B and the main channel of my weather strip is shown as C. This main channel C is made of a flat backing body 5, with the top edge formed into a semi-cylindrical or half circular top groove 6 which groove fills two purposes as will later be shown.

Near each end of the channel C there is a vertical slot 8 and securing bolts 10 are passed through these slots to hold a felt or other type of sealing strip in place on the channel C and to provide for vertical adjustment of either end of said strip. This felt is adjustable at each end by releasing the tension of the bolts 10 and dropping the felt to meet the floor when the device is being installed and then tightening the bolts again. Thus the felt may be set to meet the floor in the desired tension to insure a perfect weather seal under the door. The center of each felt strip is held from parting from the channel C by the center rivet 9, but is permitted vertical movement by the slot 7 with the rivet slidable in the slot. The felt is always held in contact with the floor by means of the spaced apart springs 12 which are described in detail hereafter.

Medially of the strip, and if needed spaced other distances in the strip, I provide a sliding guide which consists of a rivet 9 passed through slots 7 in the channel C, the rivets being passed through the felt and secured thereto with the head of the rivets 9 carried outside the strip or channel C to hold the device in slidable relation to the channel and prevent end movement or tension.

A lifting rod 19 is carried in the top curved edge of the channel with the ends bent up at 20 and back parallel to the main body again with the ends which are parallel to the body to be supported in bearing brackets 24 and 26. Notches a are cut in the top side of the channel where it merges with the curved top in which one of the bent up ends 20 may fit and spaced inwardly from these notches at each end of the channel b there is another notch which receives the other end 20 of the rod 19. These notches a and b are so spaced that when one end 20 is in one of the end notches a the other end 20 is in the inner notch b at the other end of the channel and by removing the channel from the door the rod may be slid from one set of notches to the other making it possible to use the channel on either right or left hand doors.

The felt strip may be made longer at each end than the channel to provide for proper closing of the device without any danger of the channel being bent by opening or closing of the door. The felt is held in yielding relation to the channel and in sealing position to the floor by spaced apart tension springs 12. These springs as shown in Figure 5 are made with an elliptical top leg portion 13 to fit into the groove at the top of the channel to force upwardly thereagainst to hold the felt down onto the floor and the other end 14 of the spring is formed into a coil with an extended leg 15 to fit along the top side of the felt strip and the end 16 of the leg 15 turned down to be inserted into the felt to give rigidity and help hold it in place at the same time holding the spring in position. The free elliptical leg 13 at the spring 12 operates freely in the channel C when the device is being operated. The flat plate 17 on the spring 12 is provided to prevent the leg 15 or end 16 from penetrating too deeply into the felt and to hold it in proper position. Thus with the form of the spring 12, the plate 17 and the channel groove 6, the springs are held in fixed relation to the channel C with their tension forcing the felt strip E downwardly at all times. When the felt is engaged with the floor the springs hold it firmly sealed thereagainst. The tension of these springs may be varied by bending the legs 13 and 15 closer together or farther apart as desired.

The support bracket for one end of the device is made with a flat back 22 and having forwardly extended bearing bosses 24 set spaced apart with the bore of the bearings vertical and adapted to receive a cotter pin 23 to hold the end 21 in the space between the two bosses using this space and the pin 23 as bearing for one end of the rod and strip. The other end of the rod and strip is supported by a bearing made with a flat back 25 and raised bearing flange 26, said flange being perforated to receive the other end 21 of the rod. On one side of the bracket 22 there is a raised flange 27 to receive one end of a support and lifting spring 18. The other end of the spring is attached to a link 28 which link is attached to the body of the channel C by securing the end under the bolt 10. This may also be soldered or welded to the channel if desired.

A contact operating member G is provided made of a right angled body having the flat base 33 to be attached to the door frame by suitable screws and with the forwardly extended slide 36 provided with a slanting side 35 adapted to engage the operating lever of the device. The operating lever consists of a bell crank lever L having inwardly turned leg brackets formed to be bored to fit over the end 21 of the rod 19 and with these legs spaced so that they fit on each side of the bearing bosses 24. The ear 39 on the upper end 37 of the lever L engages the slanting side 35 of the extended side 36 of the contact member G and the lower end 38 engages the outer side of the curved top 6 of the channel C and when the door is closed the pressure of the member G operates the lever L forcing the channel C to the floor or door sill. It will be obvious that the ear 39 on the lever end 37 of the lever L must extend beyond the edge of the door to engage the member G and with this type of device it makes it possible to place the strip on the inside of the door as well as on the outside as in my former patent application mentioned heretofore. When the door is opened a short distance the lever leaves the angled surface of the member G and the spring 18 draws the strip away from the floor or sill.

In the form or rather use of the device as shown in Figure 6 of the drawing the bottom of the door A is recessed at A1 longitudinally across the entire bottom and the bearing brackets are mounted in this recess, with the strip carried within the recess. The only change which needs to be made in this use of the device is that the top lever 37 must be provided with an extension 40 which is passed through a hole 41 in the door and has the end 42 bent down to engage the member G thus actuating the device even though it is mounted inside the door itself.

If the weather strip is desired around the rest of the door it may be provided by taking the channel C without the rest of its operating parts and securing it to the door frame in a suitable manner as shown in Figures 4, 7, 8, 9 and 10.

In Figure 4 the felt E1 is shown engaging the surface of the door with the channel C secured to the door frame on the outside with the rest of the device shown used as usual. This type of use may be utilized entirely around the other sides of the door, and the operating and supporting mechanism shown in the other figures is not used, that part being used constituting only the channel C, the felt E, and the springs 12, for holding the felt E in tension relation to the door when the door is closed. This may be made in strips cut to fit the perimeter of the door and secured by any suitable means. In Figure 9 the sectional view of the strip of material E and the channel C is shown abutting a door frame with screws holding it in place.

Figure 7 shows the use of the weather strip sealing around a door frame with the frame shown as B1, the door stop as F, and in this strip F there is a groove cut and in which groove the channel C2 is set.

In this modified form the channel C2 is made U-shaped with equal sides and the felt strip E3 is set between these sides with the securing rivets 44 securing the felt to only one side of the channel. The springs 12a are shown to hold the tension of the felt toward the door and when the door is closed the springs yield to the movement of the door.

Figure 8 shows a modified form of door stop using the felt strip E3 placed in a recess 45 in the inner stop 46 and with the springs 47 holding the strip E3 in tension position between the felt and back of the recess. The rivet 48 passes up through the slot 49 and the head of the rivet is then covered by a cover strip 50 as a part of the stop. This strip 50 has recesses therein as 51 in which the head of the rivets 48 may move when the door is closed or open.

Figure 10 shows the device with an attachment body C3 formed with a rightangled edge terminating in an extended securing flange so that in cross section the attachment plate consists of an angled body provided with a securing flange along one edge, with the flexible felt strip E3 carried in and operating within and under the main body. The leaf spring 12d held between the upper edge of the felt strip and the angled body normally hold the lower edge of the felt strip extended beyond the edge of the body to engage any closure or door which may be brought into contact therewith making a perfect sealing strip.

Having thus described my invention I desire to secure by Letters Patent and claim:

A weather strip for sealing around a closure comprising an attachment plate having a main body angled in cross section and provided with a securing flange; a non-supported felt strip flexible throughout its length, fitted into said angled body; slots in the surface of said body; rivets passed through said slots and said felt strip to hold the same in adjusted longitudinal relationship thereto; and leaf springs carried between the upper edge of said felt strip and the angled body to resiliently hold the lower edge of the said felt strip beyond the edge of the body.

GEORGE N. BRUNKER.